Patented Sept. 1, 1953

2,650,905

UNITED STATES PATENT OFFICE 2,650,905

MODIFIED DRILLING FLUIDS

Reid G. Fordyce and Massimo Baer, Springfield, Mass., assignors to Monsanto Chemical Company, St. Louis, Mo., a corporation of Delaware No Drawing. Application March 1, 1950, Serial No. 147,140

18 Claims. (Cl. 252—8.5)

This invention relates to drilling fluids or muds. More particularly, it relates to drilling fluids or muds modified with sulfonated polystyrenes and derivatives thereof.

In the art of drilling wells, especially when rotary drilling methods are used, it has been found necessary to provide some means for raising the drill cuttings to the top of the hole, to prevent water or oil from blowing out of the hole and to prevent seepage of the natural fluids into the well from the porous formations through which the hole is cut.

The problem has been solved by employing drilling fluids or muds which are essentially colloidal suspensions of special clays in water or oil. These drilling muds are pumped down through the drill shaft and out of the bottom of the hollow drill. The pumping force is sufficient to raise the mud to the surface of the well. These fluids are efficient in raising the cuttings to the top of the well provided that the muds are carefully formulated to meet certain requirements, and to overcome problems which arise which are specific to their use.

In the first place, the drilling muds must have a viscosity sufficiently low to avoid putting undue strain on the pumping and circulation system yet high enough to raise the cuttings to the top of the well. At the same time, the fluids must have thixotropic properties so that the cuttings will not settle out if the circulation is temporarily stopped.

In the second place, the fluids must have a relatively high density so that they will develop a relatively high hydrostatic pressure which will prevent the escape of gas, oil or water which are encountered in the natural formations pierced by the drill. Often considerable pressure exists in these natural formations which tends to force the gas, oil or water out of the well prematurely. The density of the drilling mud must be sufficient to counteract the naturally developed pressure.

Thirdly, the drilling muds must operate in some manner to prevent the seepage into the well of oil or water from porous strata through which the well is drilled. As a corollary to this, the muds must provide a means for sealing the porous formations so that the liquid phase of the mud does not drain off into the porous formations. In this respect, the drilling muds pose new problems per se since various natural formations are deleteriously affected by the muds and others tend to destroy the beneficial properties of the muds. Thus, certain types of shale often absorb the liquid phase of the drilling fluid resulting in a swelling of the shale. This swelling may close the hole to such an extent that it freezes the drill pipe and prevents withdrawal thereof from the well or it may cause caving or distintegration of the shale formation. On the other hand, rock salt and gypsum formations tend to flocculate the muds destroying the colloidal properties thereof.

As a general rule, the best drilling muds are suspensions of bentonite and other similar clays in water or oil. Such clays readily form colloidal dispersions which are low in viscosity, relatively stable and often sufficiently dense to hold back the formation pressures. Frequently, it is necessary to increase their density and this is done by the addition of weighting agents such as barytes.

The bentonite muds also tend to deposit on the walls of the drill hole a thin cake which is semi-porous and tends to prevent the transfer of liquids either from the porous formations into the well or from the mud into the formations. However, it is often found that this filter cake is too permeable to efficiently prevent liquid transfer. To remedy this situation, numerous additives have been proposed as modifiers for the drilling muds. Starch and carboxy methyl cellulose are the most frequently used of these modifiers. These substances tend to close the holes in the filter cake deposited on the walls of the well rendering said cake less permeable. Both starch and carboxy methyl cellulose are efficient for accomplishing this purpose but each has a property which is a drawback to its use. Starch is subject to bacterial attack in the mud storage pits, especially as the relatively high temperatures prevailing in deep wells cause high storage temperatures with the result that the starch soon becomes of little or no value for decreasing the permeability of the filter cake. Carboxy methyl cellulose is more or less impervious to bacterial attack but when it is used in quantities sufficient to be effective, it raises the viscosity of the drilling mud to such an extent that pumping and circulation of the mud becomes difficult. To compensate for the viscosity increase, it is necessary to add dispersing or thinning agents such as sodium acid pyrophosphate, sodium tetraphosphate, sodium tannate, etc. The cost of such additives is often prohibitively high.

One object of this invention is to provide a modified drilling mud.

Another object is to provide a drilling mud which is immune to attack of bacteria.

Still another object is to provide a drilling mud which will deposit a substantially impermeable filter cake on the walls of the well.

These and other objects are attained by modifying a drilling fluid or mud with a sulfonated polystyrene.

The following examples are given in illustration and are not intended as limitations on the scope of this invention. Where parts are mentioned, they are parts by weight.

EXAMPLE I

A standard water-base drilling mud was prepared by dispersing a bentonitic-type clay in water. The viscosity of the mud was determined by the standard procedure outlined in the A. P. I. code 29, Section II, using the Stormer viscosimeter. The water loss or filter loss was determined in accordance with Section V of said code. The mud had a viscosity of 40 cps. and a water loss of 15 cc. The water loss is a measure of the permeability of a filter cake such as would normally be deposited on the walls of a bore hole.

Aliquot portions of a mud prepared as in Example I were modified with two different sulfonated polystyrenes in the form of their sodium salts. One of the modifiers was prepared from a polystyrene having a molecular weight of about 10,000 and contained about 1.2 sulfonate groups per styrene unit. The second modifier was prepared from a polystyrene having a molecular weight of about 70,000 and contained about 1.2 sulfonate groups per styrene unit. The modifiers were added to the mud in two different concentrations, i. e., 2 and 4 lbs. per barrel of mud, and the modified fluids thus obtained were tested for viscosity and water loss. The results are embodied in Table I.

*Table I*

| Example | I | II | III | IV | V |
|---|---|---|---|---|---|
| Sodium polystyrene sulfonate, lbs./bbl | ---- | 2 | 4 | 2 | 4 |
| Molecular weight of polystyrene | ---- | 10,000 | 10,000 | 70,000 | 70,000 |
| Viscosity, cps | 40 | 55 | 80 | 90 | >100 |
| Water loss, cc | 15 | 7.5 | 6.5 | 4.5 | 3.0 |

In contrast to these examples, 1 lb./bbl. of carboxy methyl cellulose increased the viscosity of the drilling mud to 85 cps. and lowered the water loss to 7.2 cc.

An examination of Table I shows that sodium salts of sulfonated polystyrenes effectively reduce the water loss of bentonite drilling muds. Furthermore, if the results obtained in the examples are compared with the results obtained with carboxy methyl cellulose, it may be seen that the sulfonated polystyrene salt does not raise the viscosity of the mud very much while attaining the same degree of water loss (Example II) and that when enough of the proper sulfonated polystyrene is used to obtain approximately the same viscosity increase, the water loss is very much less (Example IV).

Further comparative tests were made with a drilling mud modified with 6 lbs./bbl. of slaked lime and 3 lbs./bbl. of an organic dispersing agent. This is typical of the so-called lime-base muds which must be used in certain locations. In these examples the same two sulfonated polystyrenes used in the previous examples were compared with start. The results are shown in Table II.

*Table II*

| Example | VI | VII | VIII | IX |
|---|---|---|---|---|
| Starch, lbs./bbl | ---- | 2 | ---- | ---- |
| Sodium polystyrene sulfonate, lbs./bbl | ---- | ---- | 0.6 | 0.6 |
| Molecular weight of polystyrene | ---- | ---- | 10,000 | 70,000 |
| Viscosity, cps | 6 | 16 | 8 | 11 |
| Water loss, cc | 22 | 21 | 19 | 10 |

From Table II it may be seen that small quantities of sodium polystyrene sulfonate are equivalent to or better than three times the weight of starch. In addition, the sodium polystyrene sulfonate is not subject to bacterial decomposition.

A third series of tests were made to determine the efficiency of the additives of this invention in lime-based muds containing a substantial quantity of dissolved salt. In this series, a lime-base mud was prepared as shown in Example VI and sodium chloride was then dissolved therein to the extent of 8 lbs./bbl. The viscosity and water loss of this mud was tested without further addition, with the addition of 4 lbs./bbl. of starch and with the addition of 4 lbs./bbl. of a sulfonated polystyrene having a molecular weight of about 70,000 and about 1.2 sulfonic acid groups per styrene unit. The results are embodied in Table III.

*Table III*

| Example | X | XI | XII |
|---|---|---|---|
| Starch, lbs./bbl | ---- | 4 | ---- |
| Sodium polystyrene sulfonate, lbs./bbl | ---- | ---- | 4 |
| Molecular weight of polystyrene | ---- | ---- | 70,000 |
| Viscosity, cps | 6 | 9 | 7 |
| Water loss, cc | 36 | 10 | 9.5 |

The results indicate that the sulfonated polystyrene does not raise the viscosity of the salt contaminated lime-base mud as much as the starch does and yet it does reduce the water loss to about the same extent. Even better results may be obtained with the brine-containing mud of Example X, if a polystyrene of a molecular weight of about 20,000 to 30,000 and sulfonated to the extent of about 1.65 sulfonic acid groups per styrene unit is used. Furthermore, if the sulfonic acid groups are at least partially esterfied with a polyhydric alcohol, especially a polyethylene glycol, greater solubility in brine-containing muds is obtained making it possible to use the sulfonated polystyrene in greater quantities with the resultant substantial decrease in water loss.

Even greater solubility in muds having a high brine content may be obtained by using trialkyl amine salts of the sulfonated polystyrenes wherein the alkyl groups contain from 1 to 3 carbon atoms. For example, a triethyl amine salt of a sulfonated polystyrene having a molecular weight of 70,000 and an average sulfonic acid content of 1.2 sulfonic acid groups per styrene unit was soluble in a 95% saturated (25° C.) aqueous brine solution to the extent of 8%, whereas, the sodium salt of the same sulfonated polystyrene was soluble only to the extent of 1.5%. By reducing the molecular weight of the polystyrene to from 20,000 to 30,000 and increasing the sulfonation to 1.6–2.0 sulfonic acid groups per styrene unit, the brine solubility of the trialkyl amine salts could be increased to about 15%. Trimethyl and tripropyl amine salts may be used in place of the triethyl amine salts.

Other amine salts of sulfonated polystyrenes increases the solubility thereof in brine to varying extents. Thus, triethanol amine, dimethyl ethanol amine, methyl diethanol amine, monoethanol amine, butyl amine, etc. salts have been used and found to give increased brine solubility as compared to alkali metal salts. Quarternary ammonium derivatives of sulfonate polystyrenes may also be used providing the organic radicals substituted on the nitrogen contain no more than 5 carbon atoms.

For some types of muds, it is desirable to use a mixture of alkali metal and amine or quarternary ammonium salts of polystyrene. Thus, a lime-base mud containind substantial quantities of salt will give better results if some of the sulfonated polystyrene is present in the form of its sodium salt and the remainder in the form of its triethyl amine salt.

When the drilling muds are oil-base muds, the sulfonated polystyrenes should be used in the form of the alkyl or aryl esters thereof since the esters are more soluble in the oils. Particularly valuable for this purpose are polystyrenes which have been alkylated prior to the sulfonation reaction.

The sulfonated polystyrenes that may be used to modify drilling muds are polymers and copolymers of styrene and substituted styrenes which have been sulfonated to the extent of from 0.7 to 2.0 sulfonic acid group per styrene unit. They should have a molecular weight, as determined by the Staudinger method, of from 10,000 to 400,000. If a copolymer is used, the styrene or substituted styrene should constitute at least 50% of the copolymer. Among the materials which may be used are polymers of styrene, alpha-alkyl styrene such as alpha methyl, alpha ethyl, alpha butyl, alpha stearyl styrenes, ring-substituted alkyl styrenes such as para methyl styrene, para butyl styrene, para isopropyl styrene, para octadecyl styrene, dimethyl styrene, diethyl styrene, etc.; copolymers of the above compounds with each other or with other polymerizable materials such as dienes including butadiene, isoprene, piperylene, the alpha beta ethylenically unsaturated dicarboxylic acids such as maleic, fumaric, citraconic, mesaconic, etc. acids and the mono and diesters thereof; the acrylic and alpha-substituted acrylic acids including acrylic acid, ethacrylic acid, atropic acid, methacrylic acid and the alkyl esters thereof containing from 1 to 8 carbon atoms in the alkyl group; alpha beta unsaturated nitriles such as acrylonitrile, methacrylonitrile, atroponitrile, etc.

The sulfonation of the polymers and copolymers of polystyrene may be carried out by reaction thereof with sulfuric acid, sulfur trioxide, chlorosulfonic acids, etc. A preferred process is to sulfonate the polymers and copolymers with complexes of sulfur trioxide and dioxane or bis-(beta chlorethyl) ether under carefully controlled conditions. These methods which are disclosed and claimed in patent applications, Serial No. 109,811, now Patent No. 2,533,210, and Serial No. 109,812, now Patent No. 2,533,211, filed August 11, 1949, permit the preparation of water soluble polymers.

The sulfonated polystyrenes should be used, generally, in the form of their salts with alkali metals, alkaline earth metals, ammonia, amines, especially tertiary amines, and quaternary ammonium compounds. However, in some cases it may be preferred to use the sulfonates without first forming the salts thereof. For the water-base muds containing no salt, it is preferred to use the sodium salts for economical reasons but for such muds containing salts, it is preferred to use tertiary amine or quaternary ammonium salts due to the greater solubility of said salts in the brine. For oil-base muds, increased oil solubility may be obtained by neutralizing the polystyrene sulfonic acids with an amine and especially a tertiary amine having a long chain aliphatic substituent on the amino nitrogen. Oil solubility may also be obtained by alkylation of the polymer or copolymer prior to sulfonation or by esterifying the sulfonic acid groups at least partially with aliphatic or aromatic alcohols or phenols.

The molecular weight of the polymer may be varied between 10,000 and 400,000. This variation influences the properties of the sulfonate to a marked degree. Thus, at lower molecular weights, high water solubility is obtained but the water loss of the drilling muds is improved to a lesser degree than if the high molecular weight polymers are used. However, for drilling muds containing large amounts of salt, the lower molecular weight materials are more effective. For a water-base mud containing only a bentonitic type clay or bentonitic type clay and lime, it is preferred to use a polystyrene having a molecular weight of from 60,000 to 80,000 since these sulfonated polymers have adequate water solubility and are particularly efficient in reducing the water loss of the drilling muds.

The amount of sulfonated polystyrene which may be used may be varied over wide limits within the solubility range thereof. Between 1 and 4 pounds per 42-gallon barrel of drilling mud represents the most efficient range for preventing water loss without changing the viscosity of the mud too drastically. However, with low molecular weight polymers having a high degree of sulfonation, i. e., 1.6 to 2.0 sulfonic acid groups per styrene unit, considerably more than 4 pounds may be used effectively. In some cases, such as when viscosity is extremely critical or when only a small improvement of water loss is needed, less than 1 pound of the additive may be used down to about 0.5 pound per barrel. The amount used depends to some extent upon the nature of the earth formation encountered in drilling and on the nature of the contaminants that may be in the mud.

Preferably, the sulfonated polystyrenes are used in the form of a dry powder which may be mixed directly with the mud as needed. Under some conditions, it may be desirable to dissolve the additive in water prior to incorporating it into the mud. However, the method for the addition of the sulfonated polystyrenes to the drilling fluids is not critical.

Drilling muds containing the sulfonated polystyrenes of this invention are particularly valuable in that they promote the formation of a thin filter cake on the walls of the bore hole, said filter cake being substantially impermeable to water and naturally occurring liquids, with the result that the well is not contaminated by the naturally occurring liquids and the porous formations through which the drill passes do not absorb liquid from the mud. The latter condition is an aid in maintaining the quality of the mud, preventing swelling and cavitation of the earth formation, etc. The sulfonated polystyrenes are resistant to bacterial decomposition and do not materially affect the viscosity of the drilling muds when used in quantities which are efficient in building up the filter cake.

This application is a continuation-in-part of our copending application Serial No. 109,814 filed August 11, 1949, now Patent No. 2,615,485.

It is obvious that many variations may be made in the products and processes of this invention without departing from the spirit and scope thereof as defined in the appended claims.

What is claimed is:

1. A drilling mud containing a minor proportion of a sulfonated polystyrene which is a sulfonate of a polymer of styrene which has a molecular weight of from 10,000 to 400,000 and which contains an average of 0.7 to 2.0 sulfonic acid groups per styrene unit, the amount of said sulfonated polystyrene being restricted to from 0.5 to 4 pounds per 42-gallon barrel of drilling mud.

2. A drilling mud as in claim 1 wherein the mud is a water-base drilling mud.

3. A drilling mud as in claim 1 wherein the mud is an oil-base drilling mud.

4. A drilling mud as in claim 3 wherein the styrene polymer is an alkyl substituted polymer.

5. A drilling mud as in claim 1 wherein the sulfonated polystyrene is present in the form of its alkali metal salt.

6. A drilling mud as in claim 1 wherein the sulfonated polystyrene is present in the form of a polyhydric alcohol ester thereof.

7. A drilling mud as in claim 1 wherein the sulfonated polystyrene is present in the form of a quaternary ammonium salt thereof.

8. A drilling mud as in claim 1 wherein the sulfonated polystyrene is present in the form of its trialkyl amine salt wherein each of the alkyl groups contains from 1 to 3 carbon atoms.

9. A drilling mud as in claim 8 wherein the trialkyl amine is triethyl amine.

10. In a process for drilling a well including the steps of drilling the well and circulating in the well a drilling mud containing clayey materials capable of forming colloidal dispersions whereby a filter cake is deposited on the wall of said well to decrease the loss of fluid from said drilling mud into surrounding earthen formations, the improvement which comprises incorporating into each 42-gallon barrel of said drilling mud, from 0.5 to 4 pounds of a sulfonate of a polymer of styrene having a molecular weight of from 10,000 to 400,000 and which contains an average of 0.7 to 2.0 sulfonic acid groups per styrene unit.

11. A process as in claim 10 wherein the mud is a water-base drilling mud.

12. A process as in claim 10 wherein the mud is an oil-base drilling mud.

13. A process as in claim 12 wherein the styrene polymer is an alkyl substituted polymer.

14. A process as in claim 10 wherein the sulfonated polystyrene is present in the form of its alkali metal salt.

15. A process as in claim 10 wherein the sulfonated polystyrene is present in the form of a polyhydric alcohol ester thereof.

16. A process as in claim 10 wherein the sulfonated polystyrene is present in the form of a quaternary ammonium salt thereof.

17. A process as in claim 10 wherein the sulfonated polystyrene is present in the form of its trialkyl amine salt wherein each of the alkyl groups contains from 1 to 3 carbon atoms.

18. A process as in claim 17 wherein the trialkyl amine is triethyl amine.

REID G. FORDYCE.
MASSIMO BAER.

References Cited in the file of this patent

UNITED STATES PATENTS

| Number | Name | Date |
|---|---|---|
| 2,031,929 | Breuers | Feb. 25, 1936 |
| 2,209,591 | Barnes | July 30, 1940 |
| 2,283,236 | Soday | May 19, 1942 |
| 2,336,171 | Freeland et al. | Dec. 7, 1943 |
| 2,337,296 | Kennedy et al. | Dec. 21, 1943 |
| 2,364,434 | Foster | Dec. 5, 1944 |
| 2,399,986 | Chapman | May 7, 1946 |
| 2,425,768 | Wagner | Aug. 19, 1947 |
| 2,552,775 | Fischer et al. | May 15, 1951 |